US012177265B2

(12) United States Patent
Hung et al.

(10) Patent No.: US 12,177,265 B2
(45) Date of Patent: Dec. 24, 2024

(54) SYSTEMS AND METHODS FOR INTELLIGENT ANALYSIS AND DEPLOYMENT OF CYBERSECURITY ASSETS IN A CYBERSECURITY THREAT DETECTION AND MITIGATION PLATFORM

(71) Applicant: Expel, Inc., Herndon, VA (US)

(72) Inventors: Jane Hung, Raleigh, NC (US); Elisabeth Weber, Herndon, VA (US)

(73) Assignee: Expel, Inc., Herndon, VA (US)

( * ) Notice: Subject to any disclaimer, the term of this patent is extended or adjusted under 35 U.S.C. 154(b) by 0 days.

(21) Appl. No.: 18/669,276

(22) Filed: May 20, 2024

(65) Prior Publication Data

US 2024/0388608 A1 Nov. 21, 2024

Related U.S. Application Data

(60) Provisional application No. 63/627,338, filed on Jan. 31, 2024, provisional application No. 63/467,748, filed on May 19, 2023.

(51) Int. Cl.
*H04L 9/40* (2022.01)

(52) U.S. Cl.
CPC ........ *H04L 63/205* (2013.01); *H04L 63/1416* (2013.01); *H04L 63/1425* (2013.01)

(58) Field of Classification Search
CPC ............... H04L 63/205; H04L 63/1416; H04L 63/1425
USPC ............................................................. 726/1
See application file for complete search history.

(56) References Cited

U.S. PATENT DOCUMENTS

| 11,783,062 B2* | 10/2023 | Lounsberry | G06F 21/6218 726/30 |
| 11,983,094 B2* | 5/2024 | Downie | G06F 11/0778 |
| 2020/0274894 A1* | 8/2020 | Argoeti | H04L 63/1433 |
| 2021/0006544 A1* | 1/2021 | Lewin | H04L 63/20 |
| 2021/0149788 A1* | 5/2021 | Downie | G06F 11/3604 |
| 2023/0259632 A1* | 8/2023 | Marciano | G06F 21/577 726/25 |
| 2023/0385042 A1* | 11/2023 | Obando Chacon | G06F 8/447 |

* cited by examiner

*Primary Examiner* — Badrinarayanan
(74) *Attorney, Agent, or Firm* — Padowithz Alce; Alce PLLC; Chandler Scheitlin

(57) ABSTRACT

A system and method for deploying cybersecurity resources includes sourcing cybersecurity operations data that includes a plurality of distinct datasets derived from a handling of a target cybersecurity event; extracting, from the cybersecurity operations data, at least cybersecurity task feature data relating to a plurality of cybersecurity tasks and metadata, wherein each cybersecurity task of the plurality of cybersecurity tasks includes an identification of an operation executed when handling or the target cybersecurity event and an identification of an operator executing the operation; deriving timestamp data for each operation executed by a respective operator of each respective cybersecurity task of the plurality of cybersecurity tasks instantiating, by computer processors, a cybersecurity event data structure; using entries of the cybersecurity event data structure to compute allocation values for cybersecurity resources for handling impending cybersecurity events; and deploying, within a security operations center (SOC) of the cybersecurity service, the cybersecurity resources.

17 Claims, 4 Drawing Sheets

200

Sourcing a Cybersecurity Alert Investigation Data Corpus S210

Extracting Security Task Feature Data from the Cybersecurity Alert Investigation Data Corpus S220

Constructing a Cybersecurity Investigation Task Data Structure S230

Initiating an Automated Allocation of one or more SOC Assets based on Analyzing one or more Cybersecurity Investigation Task Data Structures S240

FIGURE 2

| Expel ID | Expel Alert ID | Actor Name | Role | Action | Actor Event Started At | Actor Event Ended At | Work Time Contribution (min) |
|---|---|---|---|---|---|---|---|
| 1 | Alert A | | system | CREATED | | | 0 |
| 2 | Alert A | Robot | system | ASSIGNED TO ROBOT | | | 0 |
| 3 | Alert A | Actor A | analyst | VIEWED | 6:26 PM | 6:27 PM | 1 |
| 4 | Alert A | Actor B | analyst | VIEWED | 7:49 PM | 7:50 PM | 1 |
| 5 | Alert A | Actor B | analyst | ASSIGNED TO ANALYST | 7:50 PM | 7:50:03 PM | 0.05 |
| 6 | Alert A | Actor B | analyst | INVESTIGATING | 7:50:03 PM | 7:55:03 PM | 5.00 |
| 7 | Alert A | Actor B | analyst | STATUS CHANGED TO ATTACK FAILED | 7:55:03 PM | | 0 |
| 8 | Alert A | Customer X | customer | | | | 0 |
| | | | | | | Total Work Time (min) | 7.05 |

FIGURE 4

SYSTEMS AND METHODS FOR INTELLIGENT ANALYSIS AND DEPLOYMENT OF CYBERSECURITY ASSETS IN A CYBERSECURITY THREAT DETECTION AND MITIGATION PLATFORM

CROSS-REFERENCE TO RELATED APPLICATIONS

This application claims the benefit of U.S. Provisional Application No. 63/467,748, filed on 19 May 2023, and U.S. Provisional Application No. 63/627,338, filed on 31 Jan. 2024, which are incorporated in their entireties by this reference.

TECHNICAL FIELD

This invention relates generally to the cybersecurity field, and more specifically to a new and useful cyber threat detection and mitigation system and methods in the cybersecurity field.

BACKGROUND

Modern computing and organizational security have been evolving to include a variety of security operation services that can often abstract a responsibility for monitoring and detecting threats in computing and organizational resources of an organizational entity to professionally managed security service providers outside of the organizational entity. As many of these organizational entities continue to migrate their computing resources and computing requirements to cloud-based services, the security threats posed by malicious actors appear to grow at an incalculable rate because cloud-based services may be accessed through any suitable Internet or web-based medium or device throughout the world.

Thus, security operation services may be tasked with mirroring the growth of these security threats and correspondingly, scaling their security services to adequately protect the computing and other digital assets of a subscribing organizational entity. However, because the volume of security threats may be great, it may present one or more technical challenges in scaling security operations services without resulting in a number of technical inefficiencies that may prevent or slowdown the detection of security threats and efficiently responding to detected security threats.

Thus, there is a need in the cybersecurity field to create improved systems and methods for intelligently scaling threat detection capabilities of a security operations service while improving its technical capabilities to efficiently respond to an increasingly large volume of security threats to computing and organizational computing assets.

The embodiments of the present application described herein provide technical solutions that address, at least the need described above.

BRIEF DESCRIPTION OF THE FIGURES

FIG. 2 illustrates an example method 200 in accordance with one or more embodiments of the present application;

FIG. 4 illustrates an example schematic of a cybersecurity investigation task data structure in accordance with one or more embodiments of the present application.

BRIEF SUMMARY OF THE INVENTION(S)

Figure 1:
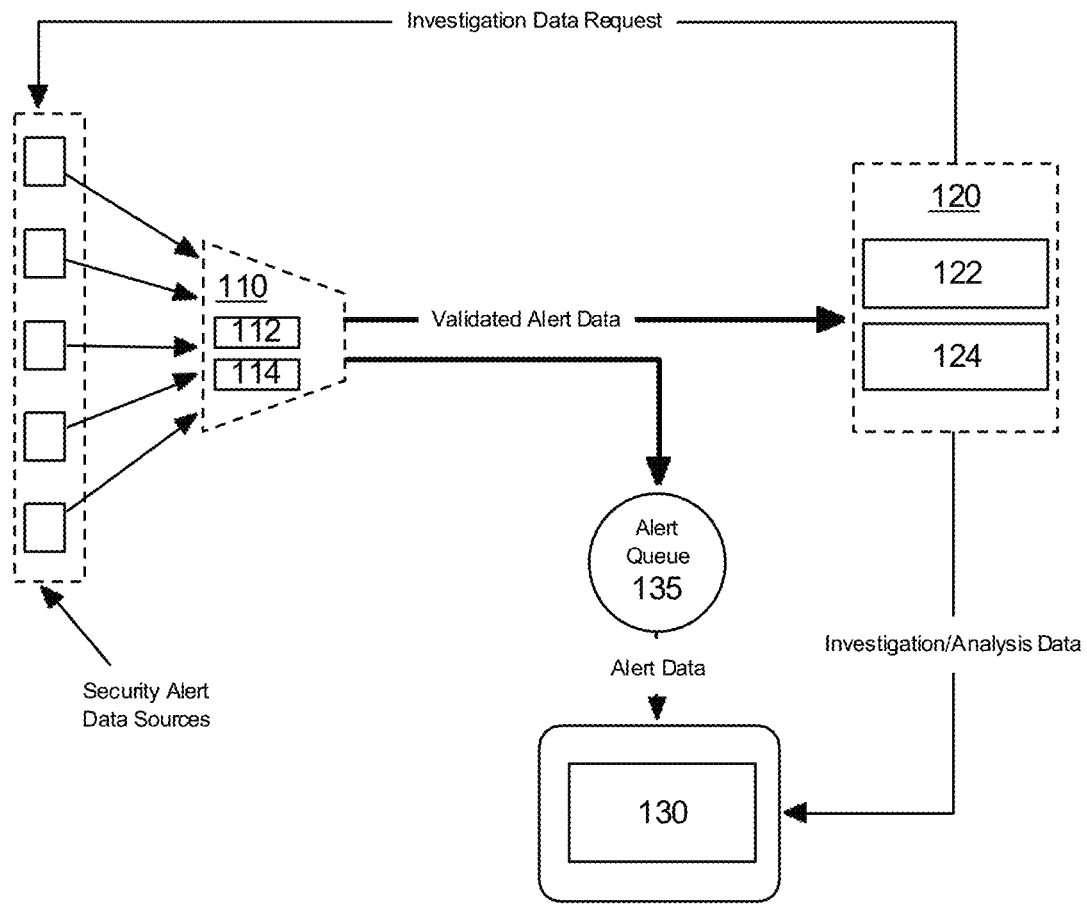
FIG. 1 illustrates a schematic representation of a system 100 in accordance with one or more embodiments of the present application.

In one embodiment, a method for intelligent deployment of cybersecurity resources, the method comprising: at a cybersecurity service: sourcing, from a computer database, a corpus of cybersecurity operations data that includes a plurality of distinct datasets derived from a handling of a target cybersecurity alert or a target cybersecurity event; extracting, from the corpus of cybersecurity operations data, at least cybersecurity task feature data relating to a plurality of cybersecurity tasks and metadata associated with the handling of the target cybersecurity alert or the target cybersecurity event, wherein each cybersecurity task of the plurality of cybersecurity tasks includes an identification of an operation executed when handling the target cybersecurity alert or the target cybersecurity event and an identification of an operator executing the operation; deriving timestamp data for each operation executed by a respective operator of each respective cybersecurity task of the plurality of cybersecurity tasks based on one or more activity data logs associated with the respective operator; instantiating, by one or more computer processors, a cybersecurity event data structure based on the extracted cybersecurity task feature data and the derived timestamp data; using one or more entries of the cybersecurity event data structure to compute one or more allocation values for one or more cybersecurity resources for handling impending cybersecurity events or cybersecurity alerts; and deploying, within a security operations center (SOC) of the cybersecurity service, the one or more cybersecurity resources based on the one or more allocation values for efficiently handling impending cybersecurity events or cybersecurity alerts.

In one embodiment, deriving timestamp data for each operation includes: identifying an initiating activity of the respective operator based on the one or more activity data logs associated with the respective operator, wherein the initiating activity includes a computer-based action by the respective operator indicating a start of an assessment of the target cybersecurity event or the target cybersecurity alert, and deriving a start timestamp of the timestamp data based on identifying a clock time within the one or more activity data logs at which the initiating activity occurred.

In one embodiment, deriving timestamp data for each operation includes: identifying a terminating activity of the respective operator based on the one or more activity data logs associated with the respective operator, wherein the terminating activity includes a computer-based action by the respective operator indicating a termination or a tentative termination of an assessment of the target cybersecurity event or the target cybersecurity alert, and deriving a terminal timestamp of the timestamp data based on identifying a clock time within the one or more activity data logs at which the terminating activity occurred.

In one embodiment, a computer-implemented method for intelligent deployment of cybersecurity assets includes: sourcing, from a computer database, a corpus of cybersecurity operations data that includes a plurality of distinct datasets derived from a handling of a target cybersecurity alert or a target cybersecurity event; extracting, from the corpus of cybersecurity operations data, at least cybersecurity task feature data relating to a plurality of cybersecurity tasks and metadata associated with the handling of the target cybersecurity alert or the target cybersecurity event, wherein each cybersecurity task of the plurality of cybersecurity tasks includes an identification of an operation executed when handling the target cybersecurity alert or the target cybersecurity event and an identification of an operator executing the operation; deriving timestamp data for each operation executed by a respective operator of each respective cybersecurity task of the plurality of cybersecurity tasks based on one or more activity data logs associated with the respective operator; constructing, by one or more computer processors, a cybersecurity event data structure based on the extracted cybersecurity task feature data and the derived timestamp data; using one or more entries of the cybersecurity event data structure to compute one or more allocation values for one or more cybersecurity resources for handling impending cybersecurity events or cybersecurity alerts; and deploying, within a security operations center (SOC), the one or more cybersecurity resources based on the one or more allocation values for efficiently handling impending cybersecurity events or cybersecurity alerts.

In one embodiment, deriving timestamp data for each operation includes: identifying an initiating activity of the respective operator based on the one or more activity data logs associated with the respective operator, wherein the initiating activity includes a computer-based action by the respective operator indicating a start of an assessment of the target cybersecurity event or the target cybersecurity alert, and deriving a start timestamp of the timestamp data based on identifying a clock time within the one or more activity data logs at which the initiating activity occurred.

In one embodiment, the initiating activity includes a selection, via a user interface, of a cybersecurity item that causes the user interface to display event details associated with the target cybersecurity event or the target cybersecurity alert.

In one embodiment, deriving timestamp data for each operation includes: identifying a terminating activity of the respective operator based on the one or more activity data logs associated with the respective operator, wherein the terminating activity includes a computer-based action by the respective operator indicating a termination or a tentative termination of an assessment of the target cybersecurity event or the target cybersecurity alert, and deriving a terminal timestamp of the timestamp data based on identifying a clock time within the one or more activity data logs at which the terminating activity occurred.

In one embodiment, the terminating activity includes a selection, via a user interface, of an object on the user interface that causes a navigation away from the target cybersecurity event or the target cybersecurity alert.

In one embodiment, the terminating activity includes a selection, via a user interface, of a distinct cybersecurity item that causes the user interface to display event details associated with a different cybersecurity event or a different cybersecurity alert.

In one embodiment, deriving timestamp data for each operation includes: identifying a re-engagement activity of the respective operator based on the one or more activity data logs associated with the respective operator, wherein the re-engagement activity includes a computer-based action by the respective operator indicating a return to the assessment of the target cybersecurity event or the target cybersecurity alert, and deriving a subsequent start timestamp of the timestamp data based on identifying a clock time within the one or more activity data logs at which the re-engagement activity occurred.

In one embodiment, computing the one or more allocation values for the one or more cybersecurity resources includes computing the one or more allocation values based on the derived timestamp data.

In one embodiment, the method includes identifying one or more automated operators performing one or more automated operations for handling the target cybersecurity event or the target cybersecurity alert, the one or more automated operators comprising one or more cybersecurity software applications being executed by one or more computer servers; and bypassing a derivation of timestamp data associated with the one or more automated operations associated with the one or more automated operators.

In one embodiment, the method includes identifying one or more external operators performing one or more operations for handling the target cybersecurity event or the target cybersecurity alert, the one or more external operators comprising entities operating external to a cybersecurity service handling the target cybersecurity event or the target cybersecurity alert; and excluding from the derived timestamp data timestamps associated with the one or more operations associated with the one or more external operators.

In one embodiment, the method includes computing an aggregated SOC operating time for the target cybersecurity event or the target cybersecurity alert based on distinct timestamp data for each operation of the plurality of operations executed by the at least one operator, wherein computing the one or more allocation values for the one or more cybersecurity resources includes computing the one or more allocation values based on the aggregated SOC operating time.

In one embodiment, the cybersecurity event data structure includes a plurality of columns, each column of the plurality of columns includes a distinct header, constructing the cybersecurity event data structure includes: executing computer instructions, that when executed, (a) searches the corpus of cybersecurity operations data for data items associated with each distinct header of the plurality of columns, (b) retrieves the data items from the corpus of cybersecurity operations data, (c) automatically populates respective entry cells of each distinct header with the data items, the data items include at least an identification of a plurality of distinct operators and a plurality of distinct operations performed by the plurality of distinct operators for handling the target cybersecurity event or the target cybersecurity alert.

In one embodiment, deploying, within the SOC, the one or more cybersecurity resources includes launching a plurality of SOC nodes for handling impending cybersecurity events or impending cybersecurity alerts, wherein each SOC node of the plurality of SOC nodes includes a combination of at least computing resources, software application resources, and analyst resources.

In one embodiment, the cybersecurity event data structure identifies one or more operators that include one or more cybersecurity software applications being executed by one or more computer servers for executing one or more automated cybersecurity workflows for accelerating a handling of the target cybersecurity event or the target cybersecurity alert.

In one embodiment, a computer-program product comprising a non-transitory machine-readable storage medium storing computer instructions that, when executed by one or more processors, perform operations including: sourcing, from a computer database, a corpus of cybersecurity operations data that includes a plurality of distinct datasets derived from a handling of a target cybersecurity alert or a target cybersecurity event; extracting, from the corpus of cybersecurity operations data, at least cybersecurity task feature data relating to a plurality of cybersecurity tasks and metadata associated with the handling of the target cybersecurity alert or the target cybersecurity event, wherein each cybersecurity task of the plurality of cybersecurity tasks includes an identification of an operation executed when handling the target cybersecurity alert or the target cybersecurity event and an identification of an operator executing the operation; deriving timestamp data for each operation executed by a respective operator of each respective cybersecurity task of the plurality of cybersecurity tasks based on one or more activity data logs associated with the respective operator; instantiating, by one or more computer processors, a cybersecurity event data structure based on the extracted cybersecurity task feature data and the derived timestamp data; using one or more entries of the cybersecurity event data structure to compute one or more allocation values for one or more cybersecurity resources for handling impending cybersecurity events or cybersecurity alerts; and supporting a deployment, within a security operations center (SOC) of the cybersecurity service, the one or more cybersecurity resources based on the one or more allocation values for efficiently handling impending cybersecurity events or cybersecurity alerts.

In one embodiment, deriving timestamp data for each operation includes: identifying an initiating activity of the respective operator based on the one or more activity data logs associated with the respective operator, wherein the initiating activity includes a computer-based action by the respective operator indicating a start of an assessment of the target cybersecurity event or the target cybersecurity alert, and deriving a start timestamp of the timestamp data based on identifying a clock time within the one or more activity data logs at which the initiating activity occurred.

In one embodiment, deriving timestamp data for each operation includes: identifying a terminating activity of the respective operator based on the one or more activity data logs associated with the respective operator, wherein the terminating activity includes a computer-based action by the respective operator indicating a termination or a tentative termination of an assessment of the target cybersecurity event or the target cybersecurity alert, and deriving a terminal timestamp of the timestamp data based on identifying a clock time within the one or more activity data logs at which the terminating activity occurred.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

1. System for Remote Cyber Security Operations & Automated Investigations

As shown in FIG. 1, a system 100 for implementing remote cybersecurity operations includes a security alert engine 110, an automated security investigations engine 120, and a security threat mitigation user interface 130. The system 100 may sometimes be referred to herein as a cybersecurity threat detection and threat mitigation system 100, a cybersecurity service 100, a cybersecurity event detection and response service 100, and/or a cybersecurity alert detection and response platform 100.

The system 100 may function to enable real-time cybersecurity threat detection, agile, and intelligent threat response for mitigating detected security threats.

1.1 Security Alert Engine

The security alert aggregation and identification module 110, sometimes referred to herein as the "security alert engine 110" may be in operable communication with a plurality of distinct sources of cyber security alert data. In one or more embodiments, the module 110 may be implemented by an alert application programming interface (API) that may be programmatically integrated with one or more APIs of the plurality of distinct sources of cyber security alert data and/or native APIs of a subscriber to a security service implementing the system 100.

In one or more embodiments, the security alert engine 110 may include a security threat detection logic module 112 that may function to assess inbound security alert data using predetermined security detection logic that may validate or substantiate a subset of the inbound alerts as security threats requiring an escalation, an investigation, and/or a threat mitigation response by the system 100 and/or by a subscriber to the system 100.

Additionally, or alternatively, the security alert engine 100 may function as a normalization layer for inbound security alerts from the plurality of distinct sources of security alert data by normalizing all alerts into a predetermined alert format.

1.1.1 Security Alert Machine Learning System

Optionally, or additionally, the security alert engine 110 may include a security alert machine learning system 114 that may function to classify inbound security alerts as validated or not validated security alerts, as described in more detail herein.

The security alert machine learning system 114 may implement a single machine learning algorithm or an ensemble of machine learning algorithms. Additionally, the security alert machine learning system 114 may be implemented by the one or more computing servers, computer processors, and the like of the artificial intelligence virtual assistance platform 110.

The machine learning models and/or the ensemble of machine learning models of the security alert machine learning system 114 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be used in implementing the security alert machine learning system 114 and/or other components of the system 100.

1.2 Automated Investigations Engine

The automated security investigations engine 120, which may be sometimes referred to herein as the "investigations engine 120", preferably functions to automatically perform investigative tasks for addressing a security task and/or additionally, resolve a security alert. In one or more embodiments, the investigations engine 120 may function to automatically resolve a security alert based on results of the investigative tasks.

In one or more embodiments, the investigations engine 120 may include an automated investigation workflows module 122 comprising a plurality of distinct automated investigation workflows that may be specifically configured for handling distinct security alert types or distinct security events. Each of the automated investigation workflows preferably includes a sequence of distinct investigative and/or security data production tasks that may support decisioning on or a disposal of a validated security alert. In one or more embodiments, the investigations engine 120 may function to select or activate a given automated investigation workflow from among the plurality of distinct automated investigation workflows based on an input of one or more of validated security alert data and a security alert classification label.

Additionally, or alternatively, the investigations engine 120 may include an investigations instructions repository 124 that includes a plurality of distinct investigation instructions/scripts or investigation rules that inform or define specific investigation actions and security data production actions for resolving and/or addressing a given validated security alert. In one or more embodiments, the investigations instructions repository 124 may be dynamically updated to include additional and/or to remove one or more of the plurality of distinct investigation instructions/scripts or investigation rules.

1.3 Security Threat Mitigation User Interface

The security mitigation user interface 130 (e.g., Workbench) may function to enable an analyst or an administrator to perform, in a parallel manner, monitoring, investigations, and reporting of security incidents and resolutions to subscribers to the system 100 and/or service implementing the system 100. In some embodiments, an operation of the security user interface 130 may be transparently accessible to subscribers, such that one or more actions in monitoring, investigation, and reporting security threats or security incidents may be surfaced in real-time to a user interface accessible to a subscribing entity.

Accordingly, in or more embodiments, a system user (e.g., an analyst) or an administrator implementing the security mitigation user interface 130 may function to make requests for investigation data, make requests for automated investigations to the automated investigations engine 120, obtain security incident status data, observe or update configuration data for automated investigations, generate investigation reports, and/or interface with any component of the system 100 as well as interface with one or more systems of a subscriber.

Additionally, or alternatively, in one or more embodiments, the security mitigation user interface 130 may include and/or may be in digital communication with a security alert queue 135 that stores and prioritizes validated security alerts.

2. Method for Intelligent Analysis and Deployment of Cybersecurity Assets

As shown in FIG. 2, a method 200 for intelligent analysis and deployment of cybersecurity assets may include sourcing a cybersecurity alert investigation data corpus S210, extracting security task feature data from the cybersecurity alert investigation data corpus S220, constructing a cybersecurity investigation task data structure S230, and initiating an automated allocation of one or more SOC assets based on analyzing one or more cybersecurity investigation task data structures S240.

2.1 Sourcing a Cybersecurity Alert Investigation Data Corpus

S210, which includes sourcing a cybersecurity alert investigation data corpus, may function to source a corpus of cybersecurity investigation data for a distinct target cybersecurity alert or cybersecurity event. In one or more embodiments, cybersecurity investigation data (sometimes referred to herein as cybersecurity alert investigation data or cybersecurity event investigation data) may refer to any data related to an investigation of a distinct cybersecurity alert, and may include, but is not limited to, vendor alert data, continuous telemetry data, subscriber data, investigative data, and/or any other data that may relate to a cybersecurity event or cybersecurity alert, and/or an investigation thereof.

In some embodiments, the cybersecurity alert investigation data corpus may include cybersecurity alert data and/or investigation data for a target cybersecurity alert or cybersecurity event. As generally referred to herein, a cybersecurity alert may relate to a potential cybersecurity incident or cybersecurity threat including, but not limited to, detected suspicious activity, detected malware, unauthorized access, network anomalies, phishing attempts, security policy violations, denial of service attacks, and/or any other potential cybersecurity incident or threat. In one or more embodiments, a cybersecurity alert may relate to a potential, likely, and/or probable cybersecurity threat. In some preferred embodiments, the cybersecurity alert investigation data corpus may include any or all data related to a distinct cybersecurity alert or cybersecurity event; in such preferred embodiments, the cybersecurity alert investigation data corpus may be associated with the target cybersecurity alert or event.

Figure 3:
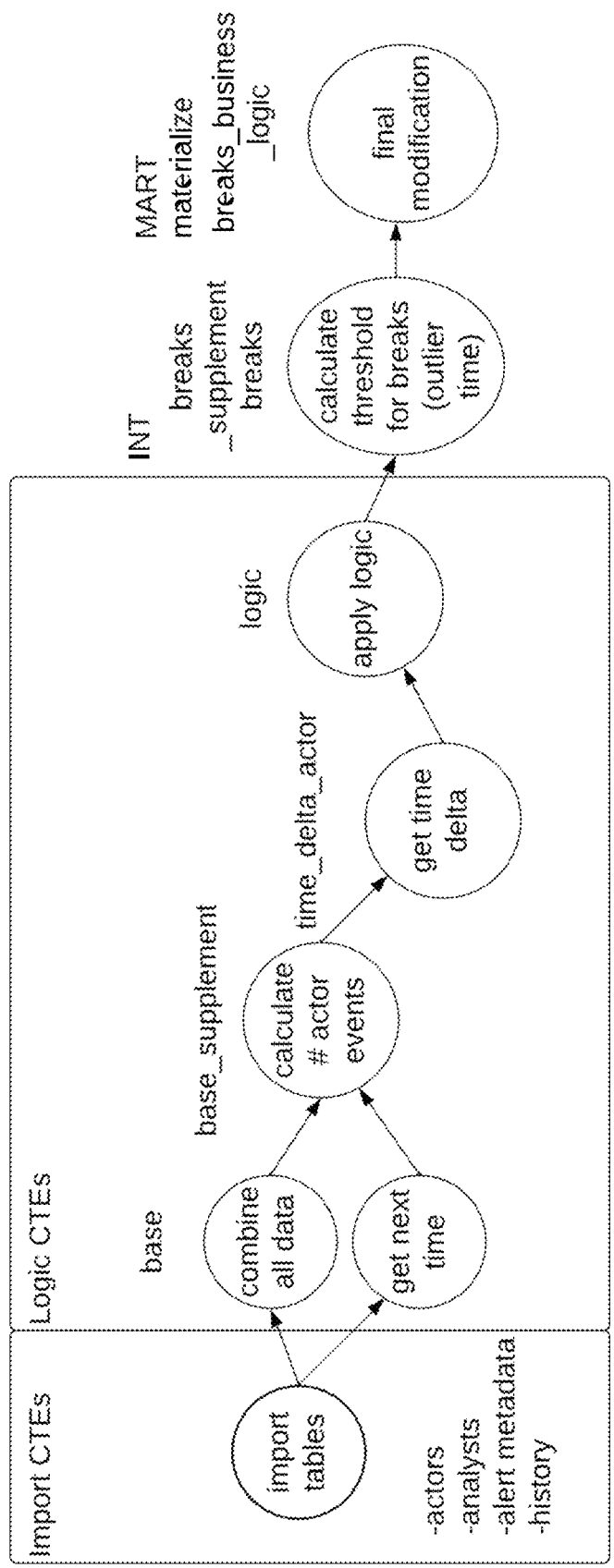
FIG. 3 illustrates an example schematic of a flow of cybersecurity investigation data in accordance with one or more embodiments of the present application.

In some embodiments, S210 may function to source or collect cybersecurity alert investigation data from an automated investigation workflow initiated and/or executed to investigate the target cybersecurity alert, as described in U.S. patent application Ser. No. 17,488,800, titled SYSTEMS AND METHODS FOR INTELLIGENT CYBER SECURITY THREAT DETECTION AND MITIGATION THROUGH AN EXTENSIBLE AUTOMATED INVESTIGATIONS AND THREAT MITIGATION PLATFORM, which is incorporated in its entirety by this reference. In some such embodiments, S210 may function to source or collect cybersecurity alert investigation data from one or more automated investigation workflow historical data sources, including, but not limited to, data tables, data matrices, data logs, and/or the like. In some embodiments, S210 may function to construct one or more data retrieval queries (e.g., SQL queries or the like) to source and/or collect cybersecurity alert investigation data from one or more automated investigation workflow historical data sources. In one or more embodiments, S210 and/or method 200 may function to source, route, and/or output cybersecurity alert investigation data according to one or more cybersecurity alert investigation data flows, as shown by way of example in FIG. 3.

Additionally, or alternatively, in some embodiments, S210 may function to source or collect cybersecurity alert investigation data from one or more alert event signals and/or alert event feeds. In some such embodiments, S210 may function to source or collect cybersecurity investigation data in real-time from one or more current or active investigations of the target cybersecurity alert or event.

In some embodiments, S210 may function to source or collect cybersecurity alert investigation data from one or more backends (e.g., servers, databases, backend digital computing assets, and/or the like) or backend data sources. In such embodiments, the sourced or collected cybersecurity alert investigation data may include one or more pieces of data tracked on the backend(s) of one or more systems or services that may have previously implemented or executed a cybersecurity alert investigation or an investigation workflow for the target cybersecurity alert (i.e., historical data) and/or are currently implementing or executing a cybersecurity alert investigation or an investigation workflow for the target cybersecurity alert (e.g., real-time data). In some such embodiments, S210 may function to implement backend tracking of cybersecurity investigation data.

Additionally, or alternatively, in some embodiments, S210 may function to source or collect cybersecurity alert investigation data from one or more frontends (e.g., applications, user interfaces, frontend digital computing assets, and/or the like) or frontend data sources. In such embodiments, the sourced or collected cybersecurity alert investigation data may include one or more pieces of data tracked on the frontend(s) of one or more systems or services that may have previously implemented or executed a cybersecurity alert investigation or an investigation workflow for the target cybersecurity alert (i.e., historical data) and/or are currently implementing or executing a cybersecurity alert investigation or an investigation workflow for the target cybersecurity alert (e.g., real-time data). In some such embodiments, S210 may function to implement frontend tracking of cybersecurity investigation data.

In some embodiments, the cybersecurity alert investigation data may include one or more pieces of data relating to actions, tasks, activities, and/or the like executed by one or more SOC (security operations center) assets or entities in an investigation of the target cybersecurity alert or event. In such embodiments, the one or more SOC assets or entities may include, but are not limited to, one or more SOC computers and/or networks of computers, one or more SOC computer-implemented services, one or more SOC cloud-based assets or computing resources, one or more SOC analysts or admins, one or more alert investigation systems, one or more alert verification systems, one or more threat mitigation assets, and/or any other suitable SOC asset or entity that may function to initiate and/or execute an action, task, activity, and/or the like related to an investigation of the target cybersecurity event.

In some embodiments, S210 may function to include cybersecurity alert investigation data from one or more cybersecurity alert investigations of other (i.e., non-target) cybersecurity alerts in the cybersecurity alert data corpus. In such embodiments, S210 may function to identify other cybersecurity alert investigations of other cybersecurity alerts based on investigation time periods (e.g., cybersecurity alert investigations that may occur concurrently with, subsequent to, and/or prior to the cybersecurity alert investigation of the target cybersecurity alert), and/or common assets or entities that may have initiated and/or executed an action, task, activity, or the like (e.g., cybersecurity alert investigations that may include actions, tasks, or activities performed or executed by one or more of the same assets or entities).

2.2 Extracting Security Task Feature Data from the Cybersecurity Alert Investigation Data Corpus S220, which includes extracting security task feature data from the cybersecurity alert investigation data corpus, may function to extract one or more pieces of security task feature data related to a cybersecurity investigation workflow of the target cybersecurity alert. Security task feature data (sometimes referred to herein as security task data), as generally referred to herein, may relate to one or more pieces of data and/or metadata that may relate to one or more security tasks executed in an analysis and/or investigation of the target cybersecurity alert. A security task, as generally referred to herein, may relate to any action, task, activity, and/or the like related to an analysis and/or investigation of the target cybersecurity alert that may be initiated, executed, configured, and/or performed by an SOC asset or other entity. In some preferred embodiments, S220 may additionally function to compute one or more security task worktimes for each security task. A security task worktime, as generally referred to herein, may relate to a period of time that an SOC asset or other entity is engaged in executing or performing a corresponding security task. Accordingly, in various embodiments, S220 may function to extract and/or compute security task data based on the cybersecurity alert investigation data corpus in one or more cybersecurity alert investigation data flows, as shown by way of example in FIG. 3.

Preferably, S220 may function to identify one or more distinct security tasks based on the cybersecurity alert investigation data corpus. In some preferred embodiments, S220 may function to identify one or more elements or pieces of security task feature data for each distinct security task. In such embodiments, each piece or element of security task feature data may represent information descriptive of or otherwise related to a corresponding security task. Security task feature data elements for a security task may include, but are not limited to, an event identifier (event ID) that may identify an index that may relate to a position, rank, or order (e.g., chronological rank or order) of the corresponding security task, an alert identifier (alert ID) that may identify the target cybersecurity alert of the corresponding security task, an entity name (e.g., a name of an SOC asset or entity, a name of a subscriber, and/or the like) that may identify the asset or entity that initiated, executed, configured, and/or performed the corresponding security task, an entity role that may identify a role (e.g., system, analyst, customer, subscriber, and/or the like) of the asset or entity that initiated, executed, configured, and/or performed the corresponding security task, an security task type (e.g., created, assigned, remediated, verified, viewed, investigating, and/or the like) that may identify a type or name of the corresponding security task, a start timestamp that may identify a datetime that the corresponding security task started, an end timestamp that may identify a datetime that the corresponding security task ended, and/or any other data or metadata relating to a security task.

Computing Security Task End Timestamps

In one or more embodiments, S220 may function to compute one or more end timestamps for one or more identified distinct security tasks based on the cybersecurity alert data corpus. In some embodiments, the cybersecurity alert data corpus may be missing corresponding end timestamps for one or more distinct security tasks. In some such embodiments, for each distinct security task performed or executed by a distinct asset or entity that may lack a corresponding end timestamp in the cybersecurity alert data corpus, S220 may function to compute an end timestamp based on a delta between a start timestamp of the distinct security task and a start timestamp of a subsequent security task executed or performed by the distinct asset or entity. That is, in such embodiments, S220 may function to identify a subsequent security task performed or executed by the same asset or entity (i.e., the next security task executed or performed by the asset or entity after the distinct security task), and in turn S220 may function to compute the difference in time between the next security task and the distinct security task. In some such embodiments, S220 may function to compute the end timestamp for the distinct security task by adding the computed difference in time to the start timestamp of the distinct security task. In such a way, S220 may advantageously enable a computation of end timestamps for security tasks in digital or computing environments in which security task end timestamps may not be accurately tracked or logged. Additionally, or alternatively, S220 may function to identify or compute a start time based on an assessment of one or more activity or production logs associated with a handling of the distinct security task. In such embodiments, S220 may derive or compute a start timestamp based on identifying a recorded clock time associated with a likely initiating activity indicating a likely start time to an assessment of the distinct security task. Conversely or additionally, a terminal timestamp or a tentative terminal timestamp for the distinct activity may be based on a clock time record within the production or activity logs associated with the distinct security task.

Additionally, or alternatively, S220 may function to apply contribution logic that may modify to include, exclude, augment, or change timestamp data for a distinct security task. In one or more embodiments, contribution logic may include one or more adaptation heuristics that if conditionally satisfied by activity associated with the distinct security task may function to trigger or automatically cause a change in an estimated work time data for the distinct security task. In a first example, if an identified operator contributing to a handling of a distinct security task may not be a typical operator, automated operator, or security analyst, S220 may function to exclude contributions by the operator towards the timestamp data. Accordingly, contribution logic may define a plurality of distinct circumstances including, but not limited to, circumstances involving non-primary analyst contributions that may be included if the operator is part of an analyst team, instances in which a distinct security task has been closed contribution time data may be excluded, if a distinct security task or security alert is integrated or combined into a different security task only contributions to the distinct security task prior to the merger or integration may be considered valid work time data.

It shall be noted that, in some embodiments, assets or entities may execute security tasks in a plurality of cybersecurity alert investigations or analyses, and as such consecutive or subsequent security tasks may be associated with other cybersecurity alerts other than the target cybersecurity alert. In some such embodiments, S220 may function to identify the next or subsequent security task executed by the asset or entity regardless of which cybersecurity alert the next or subsequent security task may be associated with. In a first implementation of such embodiments, S220 may function to query one or more sources of cybersecurity alert investigation data to identify and/or return the start timestamp of the next or subsequent security task performed or executed by the asset or entity. Alternatively, in a variation, the cybersecurity alert data corpus may include security task data associated with one or more cybersecurity alert investigations that may have been performed previously, concurrently, and/or subsequently to the cybersecurity alert investigation of the target cybersecurity alert (as described in 2.1), such that S220 may function to identify and/or extract security task data for the next or subsequent security tasks that may have been performed or executed by assets or entities in other cybersecurity alert investigations.

As a non-limiting example, the cybersecurity alert data corpus may include security task data on two security tasks, Task A and Task B, where both security tasks have been executed by Entity A in order (i.e., Task B is the security task that was executed by Entity A after Task A). In such an example, Task A may have been executed in a cybersecurity alert investigation of the target cybersecurity alert. In such an example, the cybersecurity alert data corpus may include a start timestamp for Task A and a start timestamp for Task B, and the cybersecurity alert data corpus may lack an end timestamp for Task A. In such an example, S220 may function to compute a delta (difference) between the start timestamp for Task B and the start timestamp for Task A, and in turn S220 may function to compute the end timestamp for Task A based on the computed delta. It shall be noted that, in such an example, both Task A and Task B may have been executed in a cybersecurity alert investigation of the target cybersecurity alert; alternatively, in such an example, Task B may have been performed in a cybersecurity alert investigation of a cybersecurity alert other than the target cybersecurity alert.

Computing Security Task Worktimes

In some preferred embodiments, S220 may additionally or alternatively function to compute one or more security task worktimes for one or more security tasks performed or executed in an analysis of the target cybersecurity alert. In some embodiments, S220 may function to compute the one or more security task worktimes based on a difference (delta) between start and end timestamps associated with each security task. In such embodiments, the difference between the start and end timestamps for a distinct security task may represent the security task worktime or an estimate task worktime for the asset or entity that may have performed or executed that distinct security task. Accordingly, in such embodiments, a computed security task worktime for a distinct security task may represent a duration between the time a distinct asset or entity starts execution of the distinct security task and the time that the distinct asset or entity completes (ends) execution of the distinct security task. In some embodiments, a security task worktime may be computed and/or stored as a numerical value, such as a duration (e.g., a numerical value of seconds, minutes, hours, and/or the like). Alternatively, in some embodiments, a security task worktime may be computed and/or stored in any suitable datetime format.

In some embodiments, once a security task worktime for a distinct security task is computed, S220 may function to evaluate the computed security task worktime relative to a maximum and/or minimum-security task worktime outlier threshold. A security task worktime outlier threshold, as generally referred to herein, may relate to a numerical threshold value that may represent a maximum or minimum value for valid (i.e., non-outlier) computed worktimes. In such embodiments, if the computed security task worktime is above a maximum-security task worktime outlier threshold and/or below a minimum-security task worktime outlier threshold, S220 may identify the computed security task worktime as an outlier security task worktime. In some embodiments, S220 may function to discard one or more (or all) identified outlier security task worktimes. Alternatively, in some embodiments, S220 may function to modify one or more (or all) outlier security task worktimes to be within the maximum and/or minimum-security task worktime outlier thresholds.

In some embodiments, S220 may function to determine the maximum and/or minimum-security task worktime outlier thresholds based on one or more security task features of the corresponding security task including, but not limited to, the security task type of the corresponding security task, the asset or entity performing or executing the corresponding security task, and/or any other feature or property of the corresponding security task.

In some embodiments, S220 may additionally function to compute a total security task worktime for all security tasks of a cybersecurity investigation of the target cybersecurity alert. In such embodiments, the total security task worktime may represent a total amount of time spent by one or more assets or entities on security tasks in the cybersecurity investigation. In one or more embodiments, the total security task worktime may be computed by a summation of all total security task worktimes associated with the target cybersecurity alert (e.g., a summation of all total security task worktimes for all security tasks of a cybersecurity investigation of the target cybersecurity alert).

2.3 Constructing a Cybersecurity Investigation Task Data Structure

S230, which includes constructing a cybersecurity investigation task data structure, may function to construct or generate a cybersecurity investigation task data structure for the target cybersecurity alert based on the extracted and/or computed security task feature data for the target cybersecurity alert. A cybersecurity investigation task data structure (sometimes referred to herein as a cybersecurity task data structure), as generally referred to herein, may relate to a data structure that may function to store extracted security task feature data. Preferably, the cybersecurity investigation task data structure may function to store data relating to one or more (or all) security tasks performed or executed in an automated investigation of the target cybersecurity alert. In some preferred embodiments, the cybersecurity task data structure may function to store extracted security task feature data based on a chronology of the security tasks represented by the security task feature data.

In some preferred embodiments, the cybersecurity task data structure may include a task matrix or table that may store the extracted security task feature data, as shown by way of example in FIG. 4. As generally referred to herein, a task matrix (or task table) may relate to a 2-dimensional matrix of security task data associated with the target cybersecurity alert that may be stored in elements or entries arranged in one or more rows and columns (e.g., each element or entry may be associated or located at a row and column of the task matrix). In some such embodiments, the task matrix or table may include one or more security task rows that may each relate to a distinct security task. In such embodiments, each security task row of the task matrix may be associated with or represent a distinct security task and may include one or more pieces of security task feature data corresponding to the distinct security task. In such embodiments, S230 may function to install or embed the security task feature data relating to each security task performed in an automated investigation of the target cybersecurity alert in the task matrix. In some preferred embodiments, S230 may function to install or embed the security task feature data such that the security task rows are sorted in a chronological order in the task matrix according to a chronological order of the security tasks as performed or executed in the investigation of the target cybersecurity alert. For example, if an automated investigation of the target cybersecurity alert includes three sequentially executed or performed security tasks, a first security task row of the task matrix may represent a first (i.e., chronologically first) security task performed in the investigation of the target cybersecurity alert, a second security task row of the task matrix may represent a second (i.e., chronologically second) security task performed in the investigation of the target cybersecurity alert, and a third security task row of the task matrix may represent a third (i.e., chronologically third) security task performed in the investigation of the target cybersecurity alert. It shall be noted that the above example is non-limiting, and the task matrix of the cybersecurity task data structure may include a number n of security task rows, where n is greater than zero, corresponding to a number n of security tasks performed or executed in the investigation of the target cybersecurity alert.

Additionally, in some embodiments, the task matrix of the cybersecurity task data structure may include one or more columns, where each column of the task matrix may be associated with a distinct category or type of security task data. In a non-limiting example, the matrix may include a first column that may be associated with an event ID security task data category, a second column that may be associated with an alert ID security task data category, a third column that may be associated with an entity name (actor name) security task data category, a fourth column that may be associated with an entity role security task data category, a fifth column that may be associated with a security task type security task data category, a sixth column that may be associated with a start timestamp security task data category, a seventh column that may be associated with an end timestamp security task data category, and an eighth column that may be associated with a security task worktime security task data category. It shall be noted that the above example is non-limiting, and a number m of columns in any suitable order may be included in the task matrix for a number m of categories of security task data, where m is greater than zero.

Additionally, in some embodiments, the task matrix of the cybersecurity task data structure may include a header row that may include one or more security task data category labels, each security task data category label corresponding to a column of the task matrix. As generally referred to herein, a security task data category label may relate to an identifying label (e.g., a text label) that may identify, describe, or name the security task data category associated with the corresponding column of the task matrix.

Preferably, S230 may function to populate the task matrix of the cybersecurity task data structure with data values from the extracted security task feature data and/or computed security task feature data associated with the target cybersecurity alert (as described in 2.2). In some embodiments, each task matrix entry or element (e.g., cell) may store a corresponding element of extracted or computed security task feature data. As described above, in some embodiments S230 may function to populate each security task row of the task matrix with security task feature data associated with a distinct security task, wherein a type of security task feature data stored in each element of the task matrix may be determined by the category of security task data associated with the column of the task matrix that the element is located.

Additionally, in some embodiments, the task matrix of the cybersecurity task data structure may include an entry or element that may store a computed total security task worktime value (as described in 2.2). In a non-limiting example, the total security task worktime value may be included in the task matrix in a column associated with security task worktime security task data. In such a non-limiting example, the total security task worktime value may be included in a row task matrix that may not be associated with a distinct security task (e.g., in a row below the security task rows of the task matrix).

2.4 Initiating an Automated Allocation of One or More SOC Assets Based on Analyzing One or More Cybersecurity Investigation Task Data Structures S240, which includes initiating an automated allocation of one or more SOC assets based on analyzing one or more cybersecurity investigation task data structures, may function to configure, activate, and/or deactivate one or more SOC assets or entities based on evaluating and analyzing security task data from one or more constructed cybersecurity investigation task data structures. In some embodiments, S240 may function to continuously, or periodically, monitor security task data from one or more constructed cybersecurity investigation task data structures to evaluate computed security task and total worktimes relative to one or more security task performance thresholds. In some such embodiments, S240 may function to automatically implement load balancing, resource allocation, and scaling of SOC assets or entities in one or more current or future cybersecurity alert investigations.

In one or more embodiments, S240 may function to monitor a performance of one or more security tasks and/or one or more entities or assets performing or executing security tasks based on evaluating computed security task worktimes and/or computed total security task worktimes in constructed cybersecurity investigation task data structures relative to one or more minimum and/or maximum security task performance thresholds. A security task performance threshold, as generally referred to herein, may relate to a minimum or maximum acceptable security task worktime value for a security task (e.g., for a single security task worktime) or set of security tasks (e.g., for a total security task worktime). Accordingly, in such embodiments, security task performance threshold(s) may define or relate to a target efficiency (e.g., target minimum and maximum acceptable worktimes) for one or more security tasks and/or sets of security tasks in cybersecurity alert investigations. In some embodiments, a security task performance threshold may be defined for each security task type and/or each set of cybersecurity tasks.

In some embodiments, if S240 identifies one or more computed security task worktimes and/or computed total security task worktimes in constructed cybersecurity investigation task data structures as below one or more minimum security task performance thresholds and/or above one or more maximum security task performance thresholds, S240 may in turn initiate or trigger an automated activation and/or deactivation of one or more SOC assets or entities to balance cybersecurity investigation workloads and efficiently allocate SOC resources. In such embodiments, S240 may function to automatically and/or dynamically initiate or activate one or more SOC assets or entities in response to identifying one or more computed security task worktimes and/or computed total security task worktimes that may be above a maximum task performance threshold as an effort to scale up SOC resources to remediate high security task worktimes. Additionally, or alternatively, in such embodiments, S240 may function to automatically and/or dynamically deactivate or reassign one or more SOC assets or entities in response to identifying one or more computed security task worktimes and/or computed total security task worktimes that may be below a minimum task performance threshold as an effort to scale down resources to efficiently allocate SOC assets or entities. In one or more embodiments, S240 may function to identify one or more target SOC assets or entities to activate or deactivate based on the security task types and/or other features of the security task data included in the constructed cybersecurity investigation task data structures.

Additionally, or alternatively, S240 may function to inform a predictive analysis for future cybersecurity investigation workloads based on evaluating security task worktimes and/or total security task worktimes relative to one or more security task performance thresholds. In some such embodiments, S240 may function to automatically configure an allocation of SOC assets or entities to one or more current or future cybersecurity alert investigations based on evaluating security task worktimes and/or total security task worktimes relative to one or more security task performance thresholds.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A method for intelligent deployment of cybersecurity resources, the method comprising:
    at a cybersecurity service:
        sourcing, from a computer database, a corpus of cybersecurity operations data that includes a plurality of distinct datasets derived from a handling of a target cybersecurity alert or a target cybersecurity event;
        extracting, from the corpus of cybersecurity operations data, at least cybersecurity task feature data relating to a plurality of cybersecurity tasks and metadata associated with the handling of the target cybersecurity alert or the target cybersecurity event, wherein each cybersecurity task of the plurality of cybersecurity tasks includes an identification of an operation executed when handling the target cybersecurity alert or the target cybersecurity event and an identification of an operator executing the operation;
        deriving timestamp data for each operation executed by a respective operator of each respective cybersecurity task of the plurality of cybersecurity tasks based on one or more activity data logs associated with the respective operator, wherein deriving the timestamp data for each operation includes:
            identifying a terminating activity of the respective operator based on the one or more activity data logs associated with the respective operator, wherein the terminating activity includes a computer-based action by the respective operator indicating a termination or a tentative termination of an assessment of the target cybersecurity event or the target cybersecurity alert, and
            deriving a terminal timestamp of the timestamp data based on identifying a clock time within the one or more activity data logs at which the terminating activity occurred;
        instantiating, by one or more computer processors, a cybersecurity event data structure based on the extracted cybersecurity task feature data and the derived timestamp data;
        using one or more entries of the cybersecurity event data structure to compute one or more allocation values for one or more cybersecurity resources for handling impending cybersecurity events or cybersecurity alerts; and
        deploying, within a security operations center (SOC) of the cybersecurity service, the one or more cybersecurity resources based on the one or more allocation values for efficiently handling the impending cybersecurity events or cybersecurity alerts.

2. The method according to claim 1, wherein deriving the timestamp data for each operation further includes:
    identifying an initiating activity of the respective operator based on the one or more activity data logs associated with the respective operator, wherein the initiating activity includes a computer-based action by the respective operator indicating a start of the assessment of the target cybersecurity event or the target cybersecurity alert, and
    deriving a start timestamp of the timestamp data based on identifying a clock time within the one or more activity data logs at which the initiating activity occurred.

3. A computer-implemented method for intelligent deployment of cybersecurity assets, the method comprising:
    sourcing, from a computer database, a corpus of cybersecurity operations data that includes a plurality of distinct datasets derived from a handling of a target cybersecurity alert or a target cybersecurity event;
    extracting, from the corpus of cybersecurity operations data, at least cybersecurity task feature data relating to a plurality of cybersecurity tasks and metadata associated with the handling of the target cybersecurity alert or the target cybersecurity event, wherein each cybersecurity task of the plurality of cybersecurity tasks includes an identification of an operation executed when handling the target cybersecurity alert or the target cybersecurity event and an identification of an operator executing the operation;
    deriving timestamp data for each operation executed by a respective operator of each respective cybersecurity task of the plurality of cybersecurity tasks based on one or more activity data logs associated with the respective operator, wherein deriving the timestamp data for each operation includes:
        identifying a terminating activity of the respective operator based on the one or more activity data logs associated with the respective operator, wherein the terminating activity includes a computer-based action by the respective operator indicating a termination or a tentative termination of an assessment of the target cybersecurity event or the target cybersecurity alert, and deriving a terminal timestamp of the timestamp data based on identifying a clock time within the one or more activity data logs at which the terminating activity occurred;

constructing, by one or more computer processors, a cybersecurity event data structure based on the extracted cybersecurity task feature data and the derived timestamp data;

using one or more entries of the cybersecurity event data structure to compute one or more allocation values for one or more cybersecurity resources for handling impending cybersecurity events or cybersecurity alerts; and deploying, within a security operations center (SOC), the one or more cybersecurity resources based on the one or more allocation values for efficiently handling the impending cybersecurity events or cybersecurity alerts.

4. The computer-implemented method according to claim 3, wherein:

deriving the timestamp data for each operation further includes:

identifying an initiating activity of the respective operator based on the one or more activity data logs associated with the respective operator, wherein the initiating activity includes a computer-based action by the respective operator indicating a start of the assessment of the target cybersecurity event or the target cybersecurity alert, and deriving a start timestamp of the timestamp data based on identifying a clock time within the one or more activity data logs at which the initiating activity occurred.

5. The computer-implemented method according to claim 4, wherein the initiating activity includes a selection, via a user interface, of a cybersecurity item that causes the user interface to display event details associated with the target cybersecurity event or the target cybersecurity alert.

6. The computer-implemented method according to claim 3, wherein the terminating activity includes a selection, via a user interface, of an object on the user interface that causes a navigation away from the target cybersecurity event or the target cybersecurity alert.

7. The computer-implemented method according to claim 3, wherein the terminating activity includes a selection, via a user interface, of a distinct cybersecurity item that causes the user interface to display event details associated with a different cybersecurity event or a different cybersecurity alert.

8. The computer-implemented method according to claim 4, wherein:

deriving the timestamp data for each operation further includes:

identifying a re-engagement activity of the respective operator based on the one or more activity data logs associated with the respective operator, wherein the re-engagement activity includes a computer-based action by the respective operator indicating a return to the assessment of the target cybersecurity event or the target cybersecurity alert, and deriving a subsequent start timestamp of the timestamp data based on identifying a clock time within the one or more activity data logs at which the re-engagement activity occurred.

9. The computer-implemented method according to claim 3, wherein computing the one or more allocation values for the one or more cybersecurity resources includes computing the one or more allocation values based on the derived timestamp data.

10. The computer-implemented method according to claim 3, further comprising:

identifying one or more automated operators performing one or more automated operations for handling the target cybersecurity event or the target cybersecurity alert, the one or more automated operators comprising one or more cybersecurity software applications being executed by one or more computer servers; and bypassing a derivation of timestamp data associated with the one or more automated operations associated with the one or more automated operators.

11. The computer-implemented method according to claim 3, further comprising:

identifying one or more external operators performing one or more operations for handling the target cybersecurity event or the target cybersecurity alert, the one or more external operators comprising entities operating external to a cybersecurity service handling the target cybersecurity event or the target cybersecurity alert; and excluding from the derived timestamp data timestamps associated with the one or more operations associated with the one or more external operators.

12. The computer-implemented method according to claim 3, further comprising:

computing an aggregated SOC operating time for the target cybersecurity event or the target cybersecurity alert based on distinct timestamp data for each operation of the plurality of cybersecurity tasks executed by the respective operator, wherein computing the one or more allocation values for the one or more cybersecurity resources includes computing the one or more allocation values based on the aggregated SOC operating time.

13. The computer-implemented method according to claim 3, wherein:

the cybersecurity event data structure includes a plurality of columns, each column of the plurality of columns includes a distinct header, constructing the cybersecurity event data structure includes:

executing computer instructions, that when executed, (a) searches the corpus of cybersecurity operations data for data items associated with each distinct header of the plurality of columns, (b) retrieves the data items from the corpus of cybersecurity operations data, (c) automatically populates respective entry cells of each distinct header with the data items, the data items include at least an identification of a plurality of distinct operators and a plurality of distinct operations performed by the plurality of distinct operators for handling the target cybersecurity event or the target cybersecurity alert.

14. The computer-implemented method according to claim 3, wherein deploying, within the SOC, the one or more cybersecurity resources includes launching a plurality of SOC nodes for handling the impending cybersecurity events or impending cybersecurity alerts, wherein each SOC node of the plurality of SOC nodes includes a combination of at least computing resources, software application resources, and analyst resources.

15. The computer-implemented method according to claim 3, wherein the cybersecurity event data structure identifies one or more operators that include one or more cybersecurity software applications being executed by one or more computer servers for executing one or more automated cybersecurity workflows for accelerating the handling of the target cybersecurity event or the target cybersecurity alert.

16. A computer-program product comprising a non-transitory machine-readable storage medium storing computer instructions that, when executed by one or more processors, perform operations comprising:
sourcing, from a computer database, a corpus of cybersecurity operations data that includes a plurality of distinct datasets derived from a handling of a target cybersecurity alert or a target cybersecurity event;
extracting, from the corpus of cybersecurity operations data, at least cybersecurity task feature data relating to a plurality of cybersecurity tasks and metadata associated with the handling of the target cybersecurity alert or the target cybersecurity event, wherein each cybersecurity task of the plurality of cybersecurity tasks includes an identification of an operation executed when handling the target cybersecurity alert or the target cybersecurity event and an identification of an operator executing the operation;
deriving timestamp data for each operation executed by a respective operator of each respective cybersecurity task of the plurality of cybersecurity tasks based on one or more activity data logs associated with the respective operator, wherein deriving the timestamp data for each operation includes:
identifying a terminating activity of the respective operator based on the one or more activity data logs associated with the respective operator, wherein the terminating activity includes a computer-based action by the respective operator indicating a termination or a tentative termination of an assessment of the target cybersecurity event or the target cybersecurity alert, and
deriving a terminal timestamp of the timestamp data based on identifying a clock time within the one or more activity data logs at which the terminating activity occurred;
instantiating, by one or more computer processors, a cybersecurity event data structure based on the extracted cybersecurity task feature data and the derived timestamp data;
using one or more entries of the cybersecurity event data structure to compute one or more allocation values for one or more cybersecurity resources for handling impending cybersecurity events or cybersecurity alerts; and
supporting a deployment, within a security operations center (SOC) of the cybersecurity service, the one or more cybersecurity resources based on the one or more allocation values for efficiently handling the impending cybersecurity events or cybersecurity alerts.

17. The computer-program product according to claim 16, wherein deriving the timestamp data for each operation further includes:
identifying an initiating activity of the respective operator based on the one or more activity data logs associated with the respective operator, wherein the initiating activity includes a computer-based action by the respective operator indicating a start of the assessment of the target cybersecurity event or the target cybersecurity alert, and
deriving a start timestamp of the timestamp data based on identifying a clock time within the one or more activity data logs at which the initiating activity occurred.

* * * * *